US006118164A

United States Patent [19]
Seefeldt et al.

[11] Patent Number: 6,118,164
[45] Date of Patent: Sep. 12, 2000

[54] TRANSDUCER HAVING A RESONATING SILICON BEAM AND METHOD FOR FORMING SAME

[75] Inventors: James D. Seefeldt, DeForest; Michael F. Mattes, Janesville, both of Wis.

[73] Assignee: SSI Technologies, Inc., Janesville, Wis.

[21] Appl. No.: 08/935,210

[22] Filed: Sep. 22, 1997

Related U.S. Application Data

[62] Division of application No. 08/488,146, Jun. 7, 1995, Pat. No. 5,834,333.

[51] Int. Cl.[7] .............................. H01L 21/00; H01L 21/76
[52] U.S. Cl. ......................... 257/417; 257/418; 257/419; 257/409; 438/51; 438/52
[58] Field of Search ................................... 257/417, 418, 257/419; 438/409, 51, 52

[56] References Cited

U.S. PATENT DOCUMENTS

| | | | |
|---|---|---|---|
| 3,662,234 | 5/1972 | Ishii ........................................ | 257/417 |
| 3,909,924 | 10/1975 | Vindasius et al. ........................ | 29/574 |
| 4,258,565 | 3/1981 | Sawayama et al. ................... | 73/141 R |
| 4,532,700 | 8/1985 | Kinney et al. ............................ | 437/71 |
| 4,567,451 | 1/1986 | Greenwood ............................. | 331/155 |
| 4,628,591 | 12/1986 | Zorinsky et al. ......................... | 437/71 |
| 4,628,740 | 12/1986 | Ueda et al. ............................... | 73/705 |
| 4,665,610 | 5/1987 | Barth ....................................... | 437/228 |
| 4,744,863 | 5/1988 | Guckel et al. ........................... | 156/653 |
| 4,766,666 | 8/1988 | Sugiyama et al. ....................... | 29/610 |
| 4,771,638 | 9/1988 | Sugiyama et al. ....................... | 73/721 |
| 4,771,639 | 9/1988 | Saigusa et al. .......................... | 73/727 |
| 4,772,786 | 9/1988 | Langdon ............................. | 250/231 R |
| 4,784,721 | 11/1988 | Holmen et al. .......................... | 156/647 |
| 4,800,759 | 1/1989 | Hirata et al. ............................. | 73/708 |
| 4,805,456 | 2/1989 | Howe et al. ......................... | 73/517 AV |
| 4,841,272 | 6/1989 | Yamagishi et al. ........................ | 338/2 |
| 4,841,775 | 6/1989 | Ikeda et al. .............................. | 73/704 |

(List continued on next page.)

FOREIGN PATENT DOCUMENTS

| | | | |
|---|---|---|---|
| 0113773 | 1/1989 | Japan ..................................... | 437/901 |
| 0150532 | 2/1989 | Japan ..................................... | 437/921 |
| 1136378 | 5/1989 | Japan ..................................... | 437/901 |
| 05090615 | 4/1993 | Japan ..................................... | 437/901 |

OTHER PUBLICATIONS

H. Guckel et al., "Planar Processed, Integrated Displacement Sensors", Micromachining and Micropackaging of Transducers, Elsevier Science Publishers B.V., Amsterdam, 1985, pp. 199–203.

H. Guckel et al., "A Technology for Integrated Transducers", Wisconsin Center for Applied Microelectronics, 1985, pp. 90–92.

Ikeda et al., "Silicon Pressure Sensor with Resonant Strain Gages Built into Diaphragm", Technical Digest of the 7th Senosr Symposium, 1988, pp. 55–58.

(List continued on next page.)

*Primary Examiner*—Wael Fahmy
*Assistant Examiner*—Hung Van Duong
*Attorney, Agent, or Firm*—Michael Best & Friedrich LLP

[57] ABSTRACT

A method of forming apparatus including a force transducer on a silicon substrate having an upper surface, the silicon substrate including a dopant of one of the n-type or the p-type, the force transducer including a cavity having spaced end walls and a beam supported in the cavity, the beam extending between the end walls of the cavity, the method including the steps of: (a) implanting in the substrate a layer of a dopant of said one of the n-type or the p-type; (b) depositing an epitaxial layer on the upper surface of the substrate, the epitaxial layer including a dopant of the other of the n-type or the p-type; (c) implanting a pair of spaced sinkers through the epitaxial layer and into electrical connection with said layer, each of the sinkers including a dopant of the one of the n-type or the p-type; (d) anodizing the substrate to form porous silicon of the sinkers and the layer; (e) oxidizing the porous silicon to form silicon dioxide; and (f) etching the silicon dioxide to form the cavity and beam.

22 Claims, 8 Drawing Sheets

U.S. PATENT DOCUMENTS

| | | | |
|---|---|---|---|
| 4,853,669 | 8/1989 | Guckel et al. | 338/4 |
| 4,889,590 | 12/1989 | Tucker et al. | 156/647 |
| 4,893,509 | 1/1990 | MacIver et al. | 156/647 |
| 4,897,360 | 1/1990 | Guckel et al. | 437/7 |
| 4,901,570 | 2/1990 | Chang et al. | 73/517 AV |
| 4,926,143 | 5/1990 | Harada et al. | 331/156 |
| 4,945,769 | 8/1990 | Sidner et al. | 73/727 |
| 4,956,795 | 9/1990 | Yamaguchi et al. | 364/571.03 |
| 4,966,649 | 10/1990 | Harada et al. | 156/647 |
| 4,975,390 | 12/1990 | Fujii et al. | 437/228 |
| 4,993,143 | 2/1991 | Sidner et al. | 29/621 |
| 5,009,108 | 4/1991 | Harada et al. | 73/704 |
| 5,090,254 | 2/1992 | Guckel et al. | 73/862.59 |
| 5,095,401 | 3/1992 | Zavracky et al. | 357/51 |
| 5,110,373 | 5/1992 | Mauger | 148/33.2 |
| 5,242,863 | 9/1993 | Xiang-Zheng et al. | 437/228 |
| 5,313,836 | 5/1994 | Fujii et al. | 73/517 R |
| 5,332,469 | 7/1994 | Mastrangelo | 156/643 |
| 5,352,635 | 10/1994 | Tu et al. | 437/901 |
| 5,427,975 | 6/1995 | Sparks et al. | 437/901 |

OTHER PUBLICATIONS

Ikeda et al., "Three Dimensional Micromachining of Silicon Resonant Strain Gage", Technical Digest of the 7th Sensor Symposium, 1988, pp. 193–196.

Lee, "The Fabrication of Thin, Freestanding, Single–Crystal, Semiconductor Membranes", J. Electrochem. Soc., vol. 137, No. 8, 1990, pp. 2556–2574.

H. Guckel, "Surface micromachined pressure transducers", Sensors and Actuators A, 20, 1991, pp. 133–146.

Yoshida et al., "Photo–Induced Preferential Anodization for Fabrication of Monocrystalline Micromechanical Structures", Micro Electro Mechanical Systems, 1992, pp. 56–61.

Anderson et al., "Porous Polycrystalline Silicon: A New Material for MEMS", Journal of Microeletromechanical Systems, vol. 3, No. 1, 1994, pp. 10–18.

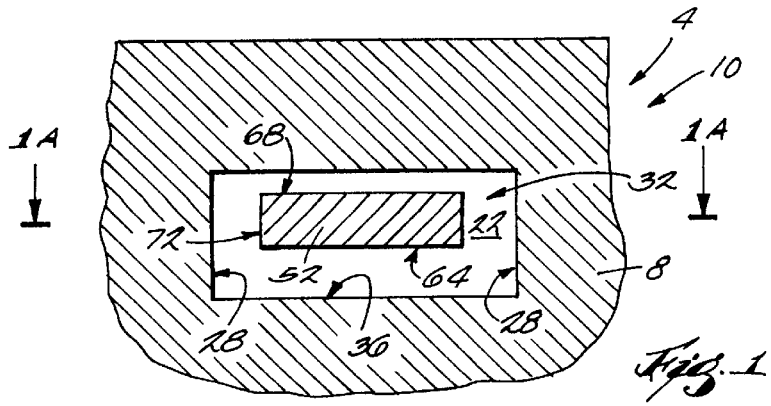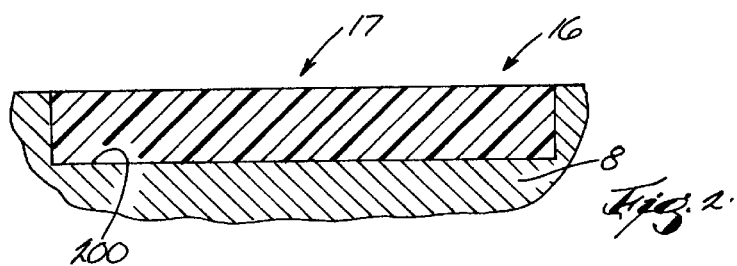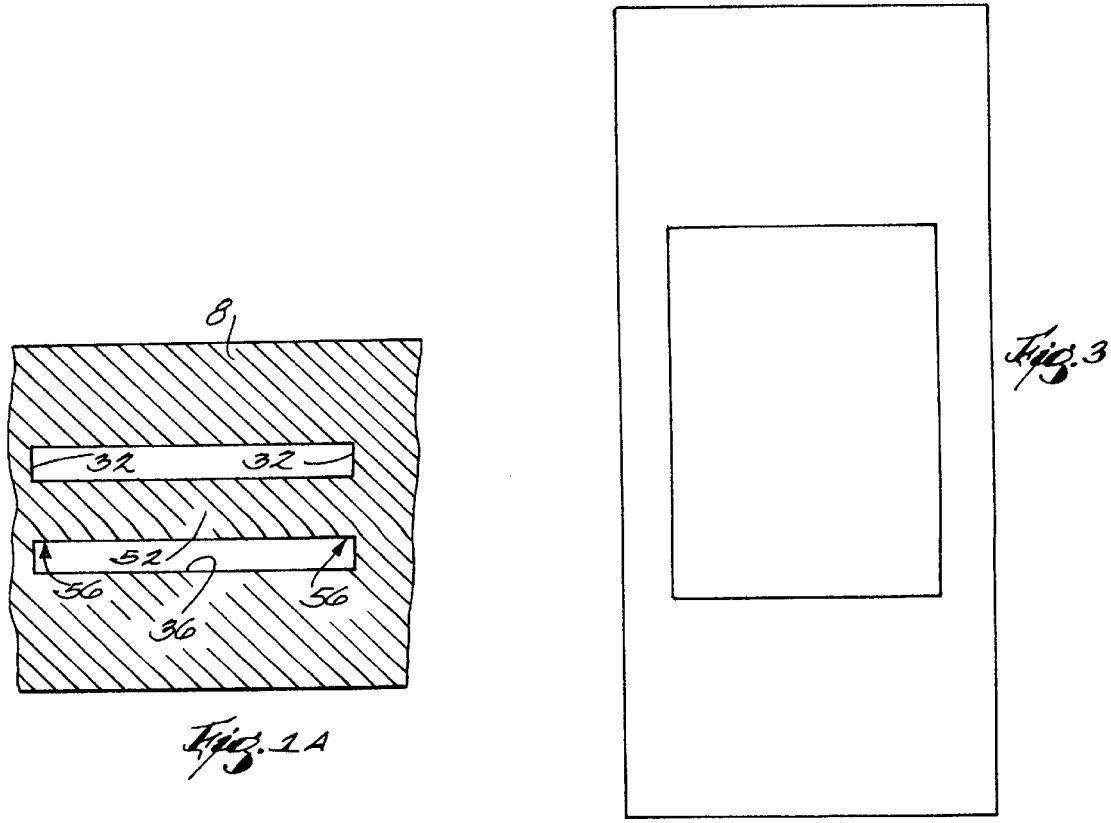

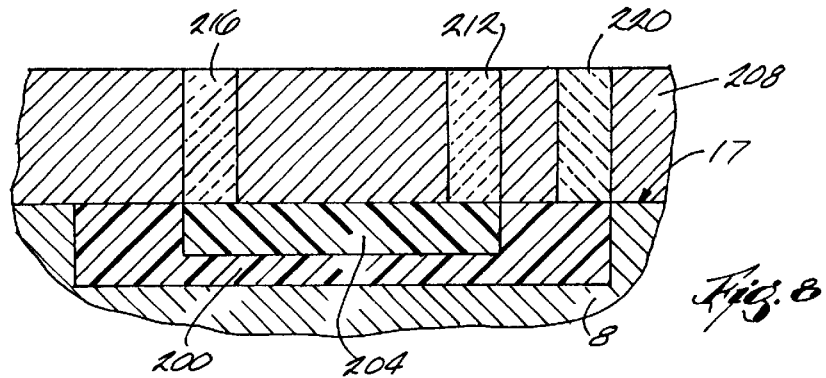
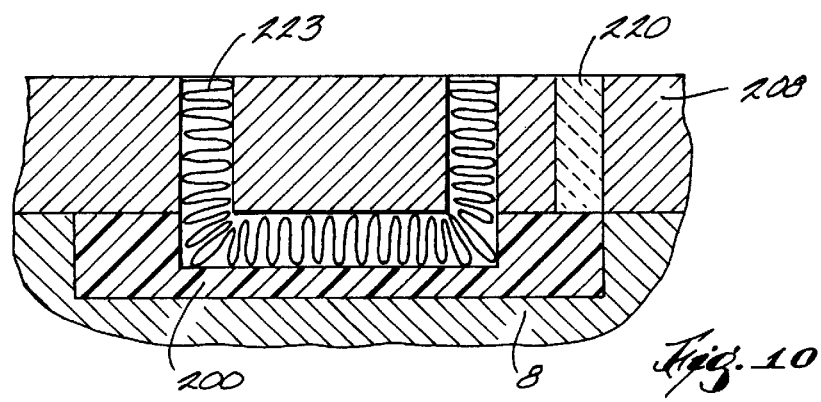
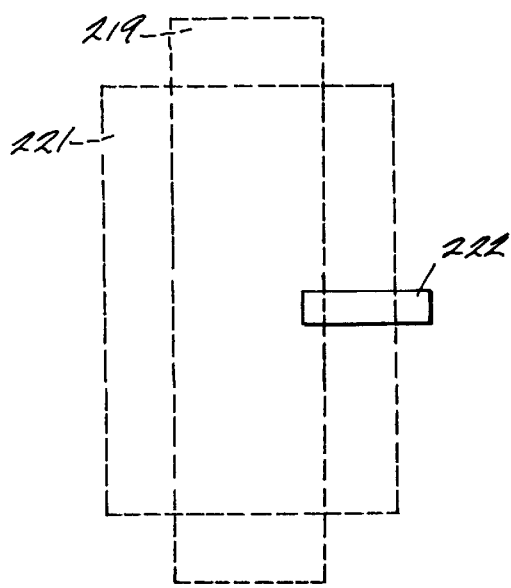

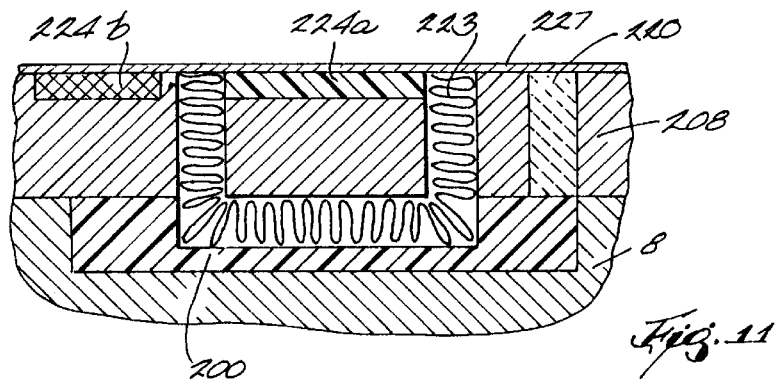
Fig. 11
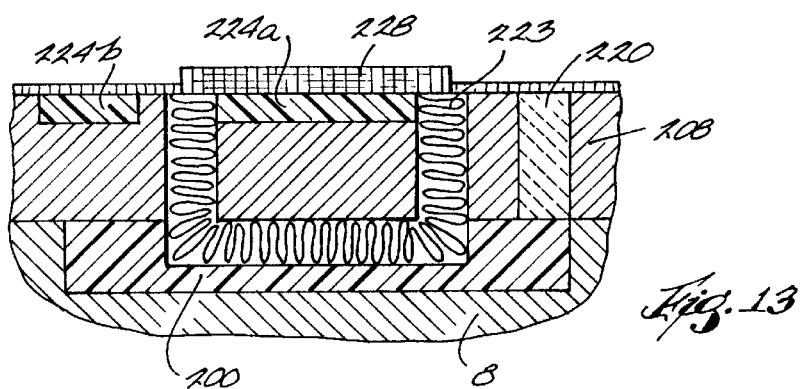
Fig. 13
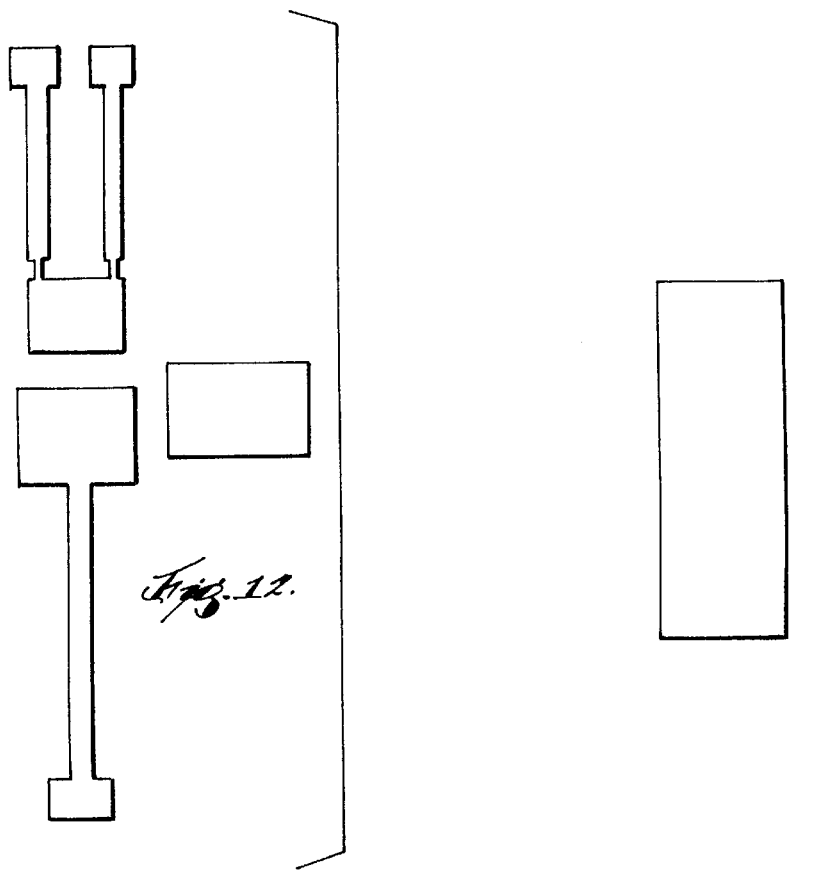
Fig. 12.
Fig. 14

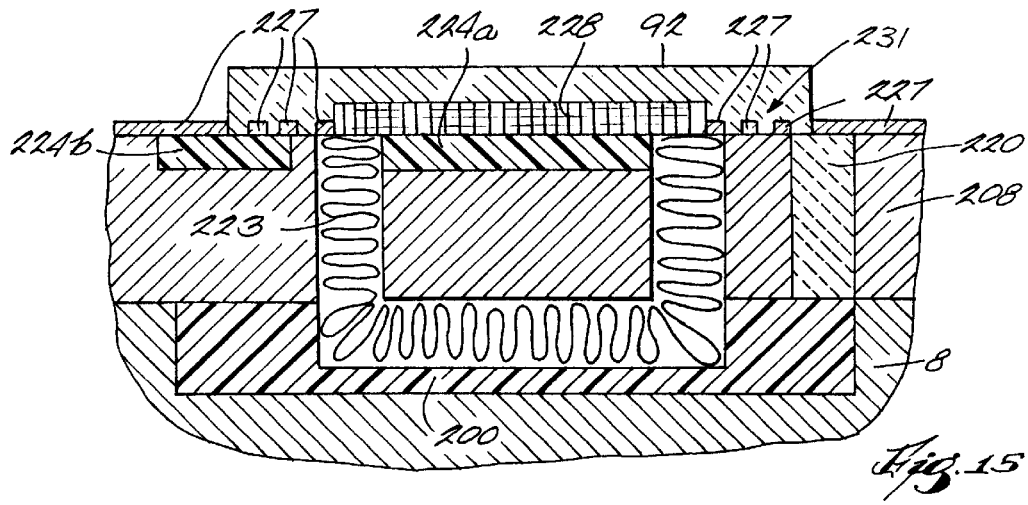
Fig. 15
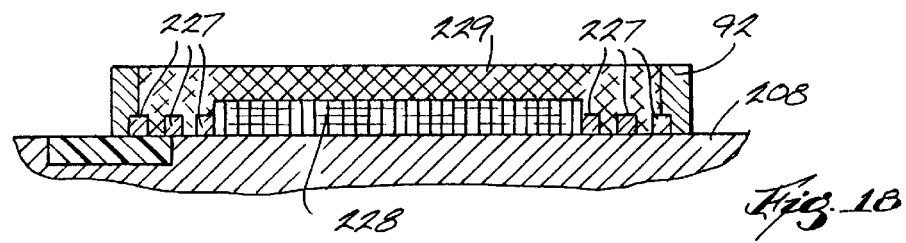
Fig. 18
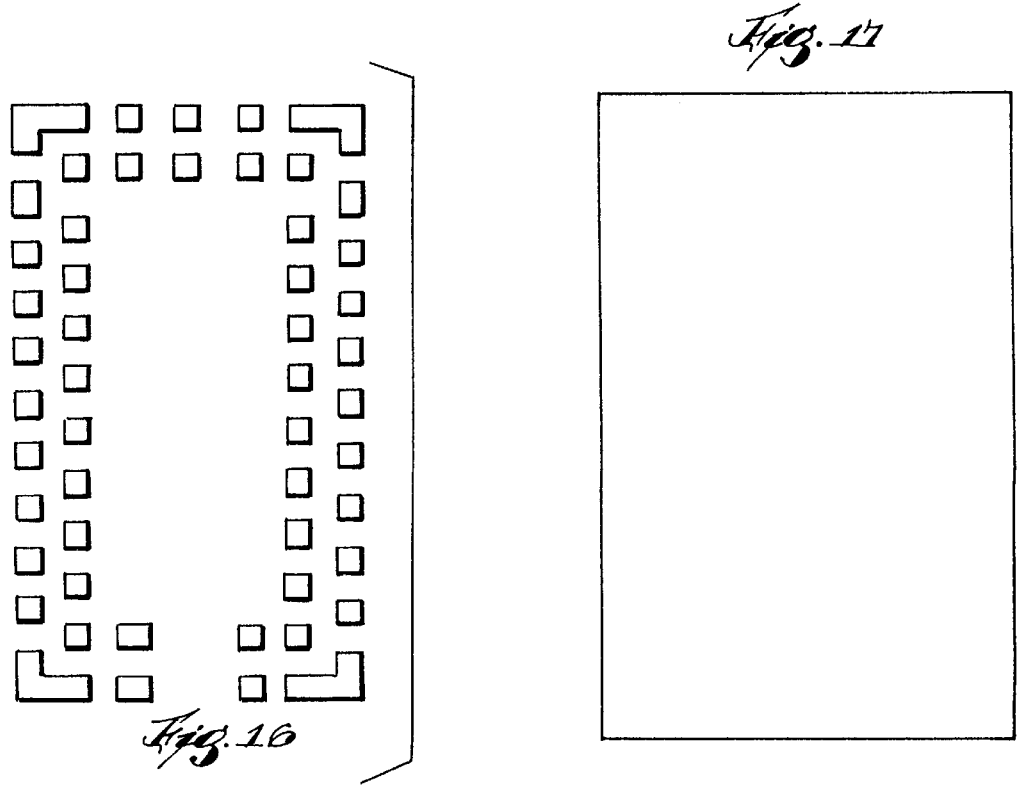
Fig. 17
Fig. 16

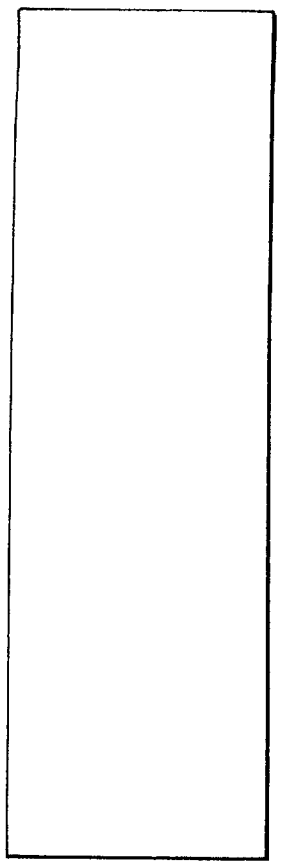
Fig. 19
Fig. 13
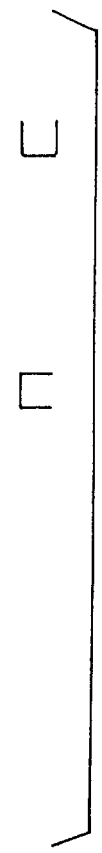
Fig. 25

TRANSDUCER HAVING A RESONATING SILICON BEAM AND METHOD FOR FORMING SAME

This Appln is division of Ser. No. 08/488,146 filed Jun. 7, 1995, now U.S. Pat. No. 5,834,333.

BACKGROUND OF THE INVENTION

1. Field of the Invention

The invention relates to apparatus such as pressure sensors which include a force transducer having a resonating silicon beam formed in a silicon wafer, and particularly to a method for forming the same.

2. Discussion of Prior Art

U.S. Pat. No. 5,090,254 to Guckel discloses a polysilicon resonating beam transducer. The transducer includes a beam of polysilicon which is mounted at its ends in a silicon substrate or wafer. The substrate and a polysilicon shell cooperate to define a cavity around the beam. The cavity is sealed from the atmosphere and evacuated to maximize the Q of the resonating beam. Resonant excitation of the beam can be accomplished in various ways, such as by capacitive excitation. Vibratory motion of the beam may be detected using an implanted resistor which is piezoresistive. Formation of the beam is carried out by depositing the beam on a sacrificial layer and surrounding the beam in a second sacrificial layer before the encapsulating polysilicon shell is formed. The sacrificial layers are etched out with liquid etchant which passes through channels in the periphery of the shell. Following etching, the interior of the cavity surrounding the beam is maintained in a wash liquid so that the beam is not deflected toward any of the adjacent surfaces, and the wash liquid is removed by freezing and sublimation. The interior surfaces of the cavity and the outer surfaces of the beam are passivated, and the channels leading into the cavity are sealed by oxidation in an oxidizing atmosphere, which also results in consumption of oxygen in the cavity.

U.S. Pat. No. 5,242,863 to Xiang-Zheng et al. relates to a silicon diaphragm piezoresistive pressure sensor having a diaphragm formed by a single-sided fabrication method. The diaphragm is formed with a cavity thereunder by: a) forming a buried low resistance layer under a predetermined diaphragm region; b) epitaxially depositing a layer of silicon; c) forming low resistance trenches through the epitaxial layer which trenches are connected with the buried low resistance layer at the edge of the buried low resistance layer; d) converting the low resistance trenches and buried low resistance layer to porous silicon by anodization in a concentrated HF solution; e) removing the porous silicon by etching; and f) filling the openings formed by etching with polysilicon to seal the cavity.

SUMMARY OF THE INVENTION

The invention provides apparatus including a force transducer having a resonating beam that is formed in a silicon wafer and which apparatus is of relatively simple and inexpensive construction. As used herein, the term beam should be interpreted broadly to include microstructures such as tuning forks, H-beams, cross beams, interleaved combs, and spiral springs, etc.

The invention also provides a method having relatively few manufacturing steps for forming apparatus including a force transducer having a resonating beam formed in a silicon wafer. In one form, the method includes the steps of implanting in a substrate a layer of either n-type or the p-type dopant; depositing a doped epitaxial layer on the upper surface of the substrate (wherein the dopant in the epitaxial layer is the opposite from that type of dopant in the substrate, i.e., if the substrate has therein a p-type dopant, then the epitaxial layer includes an n-type dopant and vice versa); implanting a pair of spaced sinkers through the epitaxial layer and into electrical connection with the epitaxial layer, each of the sinkers including either the n-type or p-type dopant; anodizing the substrate to form porous silicon from the sinkers and the underlying doped substrate layer; oxidizing the porous silicon to form silicon dioxide; and etching the silicon dioxide to form the cavity and beam.

It is an advantage of the invention to provide a method of forming a single crystal resonating beam within a cavity, which beam facilitates the placement of electronic circuitry directly on the beam.

Other features and advantages of the invention will become apparent to those skilled in the art upon review of the following detailed description, claims, and drawings.

BRIEF DESCRIPTION OF THE DRAWINGS

FIG. 1 is a cross-sectional view of a force transducer die embodying various of the features of the invention and taken along line 1—1 of FIG. 26.

FIG. 1A is a cross-sectional view of a force transducer die taken along line 1A—1A in FIG. 1.

FIG. 2 is a cross-sectional view similar to FIG. 1 and showing a buried n-type layer implanted in the substrate.

FIG. 3 is an buried n-type layer mask used in the process of creating the buried n-type layer shown in FIG. 2.

FIG. 8 is a view similar to FIG. 6 and showing an n-type sinker.

FIG. 9 is an n-type sinker mask for patterning the n-type sinker shown in FIG. 8.

FIG. 10 is a view similar to FIG. 8 and showing a precavity region.

FIG. 11 is a view similar to FIG. 10 and showing p-type layers defining a capacitor middle layer and piezoresistor.

FIG. 12 is a capacitor and piezoresistor mask for patterning the p-type layers defining the capacitor middle layer and piezoresistor shown in FIG. 11.

FIG. 13 is a view similar to FIG. 11 and showing a sacrificial layer.

FIG. 14 is a sacrificial layer mask for patterning the sacrificial layer shown in FIG. 13.

FIG. 15 is a view similar to FIG. 13 and showing a cover layer and anchors.

FIG. 16 is an anchor mask for patterning the anchor cavities shown in FIG. 15.

FIG. 17 is a cover mask for patterning the cover layer shown in FIG. 15.

FIG. 18 is a view similar to FIG. 15 and showing an upper p-type layer implanted in the cover layer.

FIG. 19 is an upper p-type layer mask for patterning the upper p-type layer shown in FIG. 18.

FIG. 23 is an electrical contact mask for patterning the electrical contact cavities shown in FIG. 22.

FIG. 25 is a metal mask for patterning the metal electrical contacts shown in FIG. 24.

Figure 5:
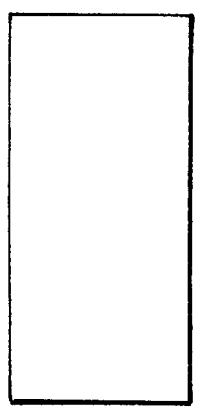
FIG. 5 is a buried p-type layer mask for patterning the buried p-type layer shown in FIG. 4.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF A PREFERRED EMBODIMENT

Figure 26:
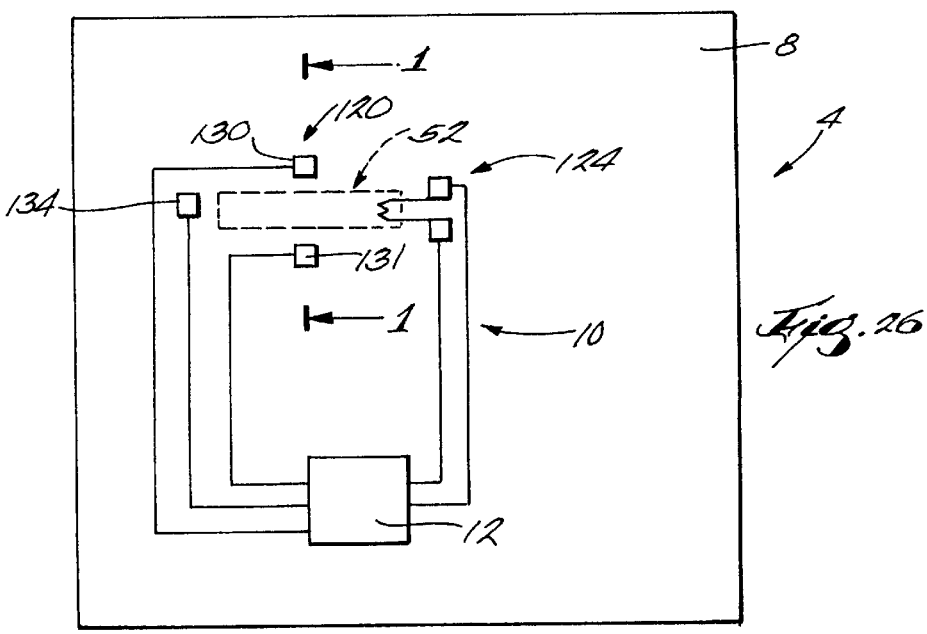
FIG. 26 is an illustration showing a force transducer of the invention.

Illustrated in the drawings is an apparatus 4 formed on a silicon wafer or substrate 8 and embodying various of the features of the invention. Although different apparatus such as pressure sensors, strain sensors and displacement sensors may be formed according to the invention, in the illustrated embodiment the apparatus 4 is a force transducer 10. The force transducer 10 (FIG. 26) includes a resonating beam formed as further described below.

The force transducer 10 also includes integrated circuitry 12 formed on the substrate 8 and connected to the force transducer 10. The integrated circuitry 12 provides power for the force transducer 10 and converts output from the force transducer 10 to a desired format. It will be appreciated by those skilled in the art that the integrated circuitry 12 can be suitably arranged in various configurations. The configurations of the integrated circuitry 12 are known and will not be described in further detail.

As shown specifically in FIGS. 1 and 2, the wafer or substrate 8 is a single crystal of silicon which is altered as described below. The wafer 8 includes spaced upper and lower side portions 16 (FIG. 2, lower side portion not shown). The upper side portion 16 includes a horizontal upper surface 17. Although the wafer 8 can be of any suitable thickness, in the illustrated embodiment the wafer 8 is about 500 microns thick. An epitaxial layer is deposited on the upper surface 17, as further described below.

A cavity 22 is defined in the upper side portion 16. For purposes of describing the cavity 22, the upper side portion 16 of the wafer 8 is taken to include the epitaxial layer (i.e., as shown in the drawings, portions of the cavity 22 are defined by the epitaxial layer deposited on the upper surface 17). The cavity 22 includes a pair of spaced side walls 28, a pair of spaced end walls 32 extending between the side walls 28, and a horizontal bottom wall 36 extending between the side walls 28 and end walls 32. The side walls 28, end walls 32 and bottom wall 36 thus cooperate to define the cavity 22.

The transducer 10 includes a beam 52 which is supported in the cavity 22. The beam 52 has a longitudinal axis and includes opposite end portions 56 (shown only in FIG. 1A) spaced along the longitudinal axis. The end portions 56 are connected to and integral with the end walls 32. The beam 52 being thus supported can be described as an end-supported or doubly-supported beam. Attachment of the beam 52 at the end portions 56 allows strains in the wafer 8 in the direction of the longitudinal axis of the beam 52 to cause changes in the resonant frequency of the beam 56. In the specific embodiment illustrated, the beam 52 is formed in the epitaxial layer 208 (FIGS. 8 and 10). In other specific embodiments (not shown), the beam 52 can be formed partially in the epitaxial layer 208 and in the upper side portion 16 of the wafer 8. The beam 52 has a length defined between the end walls 32. Although the beam 52 can be of any suitable length, in the illustrated embodiment the length of the beam 52 is about 100 $\mu$m. The beam 52 includes a lower side 64 spaced from the bottom wall 36. The beam 52 also includes an upper side 68 spaced from the lower side 64. The beam 52 has a thickness between the lower and upper sides 64 and 68. Although the beam can be of any suitable thickness, in the illustrated embodiment the beam 52 has a thickness of about 1.5 microns. The beam 52 also includes a pair of spaced sides 72 extending between the lower and upper sides 64 and 68 parallel to the side walls 28. The beam 52 has a width defined between the sides 72, which in the illustrated embodiment is about 20 microns.

The transducer 10 includes a cover layer 92 (FIG. 15) spaced from the upper side 68 of the beam 52. The cover layer 92 is supported about its periphery by the epitaxial layer 208 around the cavity 22. The cover layer 92 cooperates with the side walls 28, end walls 32 and bottom wall 36 to enclose the cavity 22 and thus define a closed space about the beam 52. Although any suitable material is appropriate, in the illustrated embodiment, the cover layer 92 consists of polysilicon having a thickness of about 2 microns. Although the space between the cover layer 92 and the upper side portion 68 of the beam 52 can be of any suitable dimension, in the illustrated embodiment the cover layer 92 is spaced about 1 micron above the upper side 68 of the beam 52. Preferably, the cavity 22 is evacuated to minimize damping of the vibrations of the beam, as further described below.

The transducer 10 includes means 120 (FIG. 26) for causing resonant motion of the beam. Although any suitable means can be employed for causing resonant motion of the beam, in the illustrated embodiment the means 120 for causing resonant motion of the beam 52 comprises electrodes which cooperate to define a capacitive drive 120. The capacitive drive 120 includes spaced lower, middle and upper electrodes or conductive regions 200, 224a, and 229 (shown in FIG. 20). The lower conductive region 200 is an n-type dopant, such as phosphorous, implanted in the substrate 8 below the bottom wall 36. The middle conductive region 224a is a p-type dopant, such as boron, implanted in the beam 52. The upper conductive region 229 is a p-type dopant, such as boron, implanted in a polysilicon cover, as described below. The lower, middle and upper conductive regions 200, 224a and 229 are electrically connected to the integrated circuitry 12 to define a capacitor or capacitive drive. It will be apparent to those skilled in the art that the beam 52 is caused to vibrate or resonate by operation of the capacitive drive in a known manner. It is also apparent that various combinations of dopants can be used to form the electrodes 200, 224a and 229.

The transducer 10 includes means 124 (FIG. 26) for measuring resonating motion of the beam 52. Although any suitable means can be used for measuring resonating motion of the beam, in the illustrated embodiment the means 124 for measuring resonating motion of the beam is a piezoresistor. The piezoresistor 124 is created by implanting in the beam 52, a dopant, such as boron. The piezoresistor 124 is connected to the integrated circuitry 12 in manner well known to those of ordinary skill in the art. The resistance of the piezoresistor 124 changes with strain in the beam 52 in accordance with the piezoresistive effect, and thus permits resonance of the beam to be measured in a known manner. It will be appreciated by those skilled in the art that in different embodiments (not shown) other specific arrangements of passive electronic circuit elements such as a capacitor or arrangement of active electronic circuitry can be used for measuring the resonant frequency of the beam. Moreover, the single crystal nature of the beam 52 allows the placement of active or passive signal conditioning circuitry (not shown) to be implanted directly on the beam 52.

The transducer 10 includes electrical contacts 130, 131 and 134 for connecting the capacitive drive 120 and piezoresistor 124 to the integrated circuitry 12. In the illustrated embodiment, the electrical contacts 130, 131 and 134 comprise conductive material, such as aluminum, which is deposited on the epitaxial layer 208. In other embodiments (not shown), the electrical contacts may be formed by dopants implanted to define conductive regions.

The transducer 10 is formed on any suitable silicon wafer or substrate 8. A suitable substrate 8 is a p-type silicon wafer of lightly doped P(100) silicon having p-type boron dopant with a carrier concentration between $10^{15}$ and $10^{16}$ cm$^{-3}$, a <100> cut lattice, 6.0–18.0 ohm-cm resistance. Wafers meeting SEMI standard prime CZ or float zone, for example, are suitable. Examples of other suitable silicon wafers are those having lower concentrations of p-type or n-type dopants than layers to be subsequently added to the wafer, such that the dopant acts as an etch stop at the boundary with the added layers.

The beam 52 having the specific construction described herein is formed by altering the p-type wafer 8 according to the following steps:

1. implanting buried n-type layer 200 in the p-type wafer 8;
2. implanting buried p-type layer 204 over the buried n-type layer 200;
3. depositing an epitaxial n-type layer 208 on the upper surface 17 of the wafer 8;
4. implanting p-type sinkers 212 and 216 through the epitaxial n-type layer 208 and into connection with the p-type layer 204;
5. implanting an n-type sinker 220 through the epitaxial n-type layer 208 and into electrical connection with the n-type layer 200;
6. forming porous silicon of the p-type layer 204 and the p-type sinkers 212 and 216 by anodization;
7. oxidizing the porous silicon to form silicon dioxide in a pre-cavity region;
8. implanting p-type layers 224 in the epitaxial n-type layer 208;
9. depositing a sacrificial layer 228;
10. etching the sacrificial layer 228;
11. growing anchor oxide 227;
12. forming anchor cavities 231 by etching anchor oxide 227;
13. depositing the cover layer 92;
14. implanting p-type layer 229 in the cover layer 92;
15. etching the cover layer 92;
16. dissolving the sacrificial layer 228 and the porous silicon dioxide by etching to form the cavity 22;
17. sealing and evacuating the cavity 22;
18. depositing an insulating layer 234;
19. etching contact cavities 235 through the insulating layer 234; and
20. depositing electrical contacts 232 for connection to the integrated circuitry 12.

It will be appreciated by those skilled in the art that various of the above-mentioned steps may be omitted or altered in different specific embodiments of the invention. For example, the steps regarding the n-type layer 200, the n-type sinker 220 and the p-type layers 224 and 226 may differ if different means are employed for causing resonance of the beam or for measuring the resonant frequency of the beam.

In the illustrated embodiment, the wafer 8 is prepared for implantation of the buried n-type layer 200 by initially forming a screening layer of SiO$_2$ on the upper surface 17 of the wafer 8. In the illustrated embodiment, the screening layer of SiO$_2$ has a thickness of about 5000+/−500 angstroms. The SiO$_2$ can be formed by any suitable means. In the illustrated embodiment, oxidation to form the SiO$_2$ screening layer is carried out by first "pushing" with about 2.25 liters per minute (l/m) of N$_2$ at a temperature of about 550° C. for a period of about 4 hours, ramping about 2.25 l/m of O$_2$ gas at a rate of about 20° C./minute, oxidizing with about 2.25 l/m of H$_2$ and O$_2$ at about 1000° C., and then ramping with about 8 l/m of N$_2$ at a rate of about 20° C./minute. The term "pushing" as used herein means inserting the wafer into the furnace. As also used herein, the term "ramping" means changing the temperature in the furnace. The SiO$_2$ screening layer is thereafter etched to achieve a substantially uniform thickness. Etching with a 10:1 buffered oxide etching solution for a period of about 5 minutes is suitable. A suitable etching solution includes about 40% ammonia fluoride, 15% hydrogen fluoride and 45% water. Those skilled in the art will recognize that forming and etching a screening layer of SiO$_2$ before each implant or deposition step may assist in control of the subsequent implantation or deposition step. In other embodiments, any of the screening layers of SiO$_2$ may be omitted.

The buried n-type layer 200 can be implanted by any suitable means. In the illustrated embodiment, the buried n-type layer 200 (FIG. 2) is patterned by applying photoresist and then exposing the photoresist with the buried n-type layer mask shown in FIG. 3, removing the mask, and then dosing with a suitable n-type dopant. In the illustrated embodiment, the n-type dopant is phosphorous, which is dosed at a concentration of $5 \times 10^{13}$ cm$^{-2}$ at 150 KeV. After the photoresist is removed, the buried n-type layer 200 is driven to a final thickness of about 3 microns by thermal annealing. Thermal annealing can be carried out in any suitable manner, such as by pushing with 2.25 l/m of N$_2$ at 850° C. for a period of about 30 minutes, ramping 2.25 l/m of O$_2$ at a rate of 20° C./minute, oxidizing with 2.25 l/m of N$_2$ at about 1050° C. for a period of about 2 hours, and ramping with 8 l/m of N$_2$ at a rate of 20° C./minute. The thermal annealing conditions specifically described above are provided for illustration, and those skilled in the art will appreciate that different conditions may be used to achieve this result.

Figure 4:
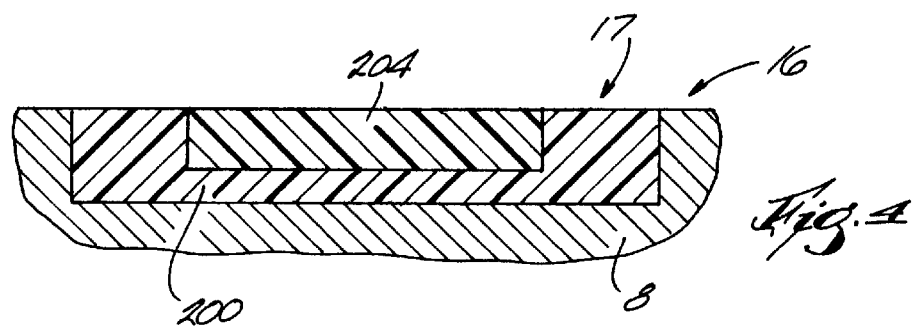
FIG. 4 is a view similar to FIG. 2 and showing a buried p-type layer.

The buried p-type layer 204 (FIG. 4) is implanted over the buried n-type layer 200 by any suitable means. In the illustrated embodiment, the wafer 8 is prepared for receiving the p-type layer 204 by first etching for 5 minutes to remove the SiOz formed in the previous thermal annealing step. The buried p-type layer 204 is patterned by applying photoresist and exposing the photoresist with the mask shown in FIG. 5. In the illustrated embodiment, the p-type dopant is boron. The boron is dosed at a concentration of $5 \times 10^{13}$ cm$^{-2}$ at energy levels of 50, 100 and 150 KeV. After the buried p-type layer 204 is implanted and the photoresist is removed, the buried p-type layer 204 is driven by thermal annealing to a final thickness of about 1 μm. Thermal annealing can be carried out by pushing with 2.25 l/m of $O_2$ at 850° C. for a period of about 30 minutes, ramping 2.25 l/m of $O_2$ at a rate of 20° C./minute, annealing with 2.25 l/m of $N_2$ at about 1000° C. for a period of about 10.5 hours, and ramping with 8 l/m of $N_2$ at a rate of 20° C./minute.

Figure 6:
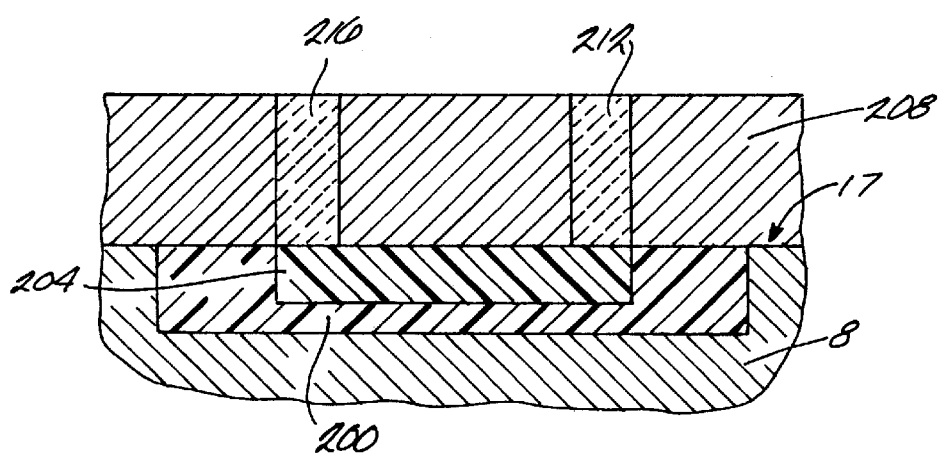
FIG. 6 is a view similar to FIG. 4 and showing an n-type epitaxial layer and two p-type sinkers.

The n-type epitaxial layer 208 (FIG. 6) is deposited on the entire upper surface 17 of the wafer 8 by epitaxial deposition. In the illustrated embodiment, the wafer 8 is prepared for receiving the n-type epitaxial layer 208 by etching to remove the $SiO_2$ formed in the previous thermal annealing step. The n-type epitaxial layer 208 is deposited in a conventional manner. In the illustrated embodiment, the n-type epitaxial layer 208 has a thickness of about 2+/−0.2 microns and a resistivity of about 0.35+/−0.05 ohms-cm.

Figure 7:
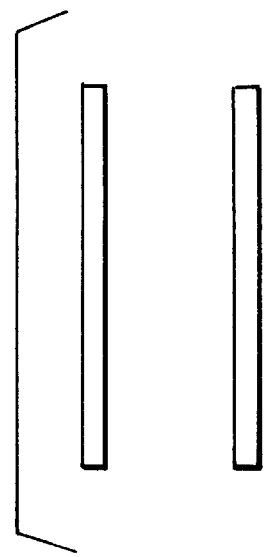
FIG. 7. is a p-type sinker mask for patterning the p-type sinkers shown in FIG. 6.

The p-type sinkers 212 and 216 (FIG. 6) are implanted in the n-type epitaxial layer 208 and into electrical connection with the p-type layer 204. In the illustrated embodiment, the n-type epitaxial layer 208 is prepared for receiving the p-type sinkers 212 and 216 by partially oxidizing the n-type epitaxial layer 208 to form a screening layer of $SiO_2$ having a thickness of about 500+/−50 angstroms. The $SiO_2$ can be formed by first "pushing" with about 2.25 liters per minute (l/m) of $H_2$ and $O_2$ at a temperature of about 850° C. for a period of about 10 minutes, and then oxidizing with about 2.25 l/m of $H_2$ and $O_2$ at about 850° C. for a period of about 30 minutes. The p-type sinkers 212 and 216 are patterned by applying photoresist and exposing the photoresist with the mask shown in FIG. 7. In the illustrated embodiment, the p-type dopant is boron dosed at a concentration of $5 \times 10^{13}$ cm$^{-2}$ at an energy level of 120 KeV. After the p-type sinkers 212 and 216 are implanted, the photoresist is removed.

The n-type sinker 220 (FIG. 8) is implanted through the n-type epitaxial layer 208 and into electrical connection with the n-type layer 200. The n-type sinker 220 is patterned by applying photoresist and exposing the photoresist with the mask shown in FIG. 9. FIG. 9 specifically shows the n-type buried layer mask 219 in phantom, the poly cover layer mask 221 in phantom and the n-sinker mask 222. In the illustrated embodiment, the n-type dopant is phosphorous dosed at a concentration of $5 \times 10^{15}$ cm$^{-2}$ at an energy level of 80 KeV. After the n-type sinker 220 is implanted and the photoresist is removed, the p-type sinkers 212 and 216 and the n-type sinker 220 are driven to final thickness by thermal annealing. Thermal annealing can be carried out in any suitable manner, such as by pushing with 2.25 l/m of $N_2$ at 850° C., ramping with 2.25 l/m of $O_2$ at a rate of 20° C./minute, annealing with 2.25 l/m of $N_2$ at about 1000° C. for a period of about 10 hours, and ramping with 8 l/m of $N_2$ at a rate of 20° C./minute to 850° C. The p-type. sinkers 212 and 216 thus are driven into electrical connection with the p-type layer 204, and the n-type sinker 220 thus is driven into electrical connection with the buried n-type layer 200.

The p-type layer 204 and the p-type sinkers 212 and 216 are anodized to form a pre-cavity region 223 (FIG. 10) consisting of porous silicon. Those skilled in the art will appreciate that anodization of the p-type layer 204 and the p-type sinkers 212 and 216 is an electrochemical process which can be carried out in any suitable manner. In the illustrated embodiment, anodization is carried out in an electrochemical cell containing from 10 to 50 weight percent hydrofluoric acid. The electrochemical cell is separated into two chambers by the wafer 8 being anodized. Two platinum plates serve as the anodic and cathodic electrodes. The back or lower side portion of the wafer 8 faces the anodic electrode and the upper side portion 16 faces the cathodic electrode. An anodization voltage between about 1 and 7 volts is applied across the electrodes. The anodization process automatically stops when the low resistance p-type layer 204 and p-type sinkers 212 and 216 are converted into porous silicon. The porous silicon thus defines a pre-cavity region 223 in the area previously occupied by the p-type layer 204 and p-type sinkers 212 and 216.

The porous silicon in the pre-cavity region 223 is oxidized to form silicon dioxide. The porous silicon can be oxidized in any suitable manner. In the illustrated embodiment, the porous silicon is oxidized by first "pushing" with about 2.25 liters per minute (l/m) of $O_2$ at a temperature of about 300° C. for a period of about 1 hour to stabilize the porous silicon, ramping with 2.25 l/m of $O_2$ at 20° C./minute, and oxidizing with 2.25 l/m of $H_2$ and $O_2$ at 850° C. for about 30 minutes to 1 hour, such that the oxide thickness is between about 1000–3000 angstroms. In the illustrated embodiment, the maximum oxidation temperature is maintained at 850° C. in order to avoid inelastic change in the resulting oxide. Upon oxidation, the porous silicon in the pre-cavity region is converted to silicon dioxide, and a layer of silicon dioxide having a thickness of about 1500 angstroms is incidentally formed over the entire upper surface of the n-type epitaxial layer 208.

The p-type layer 224 (FIG. 11) is implanted in the n-type epitaxial layer 208 by suitable means. The p-type layer 224 is patterned by applying photoresist and exposing the photoresist with the mask shown in FIG. 12. In the illustrated embodiment, the p-type dopant is boron dosed at a concentration of $5 \times 10^{15}$ cm$^{-2}$ at an energy level of 80 KeV. After the p-type layer 224 is implanted and the photoresist is removed, the p-type layer 224 is annealed. In the illustrated embodiment, the p-type layer 224 is annealed by pushing with 2.25 l/m of $N_2$ at 850° C. for a period of 10 minutes and oxidizing with 2.25 l/m of $N_2$ at 850° C. for 30 minutes. The p-type layer 224 defines the middle conductive region 224a of the capacitive drive 120. A second portion 224b of the p-type layer 224 defines an electrical pathway communicating with the upper conductive region 229 of the capacitive drive 120 and with an electrical contact, as further described below. A third portion (not shown in cross section) of the p-type layer 224 defines the piezoresistor 124. The piezoresistor 124 is identified in the mask shown in FIG. 12 as the portion having two legs.

A layer of sacrificial material is deposited over the entire n-type epitaxial layer 208 and precavity region 223 and then etched to define the sacrificial layer 228 (FIG. 13). In the illustrated embodiment, the sacrificial material is deposited over the n-type epitaxial layer 208. The sacrificial material is a low temperature oxide glass (LTO glass) having a thickness of about 1 micron. The LTO glass is deposited in a known manner, such as by chemical vapor deposition (CVD). In other embodiments, the sacrificial layer can be silicon nitride or another suitable material. The LTO glass is patterned by applying photoresist and exposing the photoresist with the mask shown in FIG. 14. The LTO glass is etched and the mask is removed to leave the sacrificial layer 228 (FIG. 13). Etching with a 10:1 buffered oxide etching solution for a period of about 10 minutes is suitable to form the sacrificial layer 228. The photoresist thereafter is removed.

The wafer 8 is prepared for receiving the cover layer 92 by forming anchor cavities 231 in a layer of anchor oxide 227 (FIG. 15). In the illustrated embodiment, the anchor cavities 231 are formed in a layer of $SiO_2$. A suitable layer of $SiO_2$ having a thickness of about 1500 angstroms can be formed by oxidized with 2.25 l/m of $H_2$ and $O_2$ at 850° C. for a period of 30 minutes. The anchor cavities 231 are patterned by applying photoresist and exposing the photoresist using the anchor mask shown in FIG. 16. The wafer is etched to form the anchor cavities 231 (FIG. 15) in the layer of $SiO_2$. Etching with a 10:1 buffered oxide etching solution for a period of about 1.5 minutes is suitable to form the anchor cavities 231. The photoresist thereafter is removed.

A layer of cover material is deposited over the entire upper side portion of the wafer and then etched to define the cover layer 92 (FIG. 17). Any suitable cover material can be used. In the illustrated embodiment, the cover material is polysilicon deposited on the wafer by low pressure chemical vapor deposition (LPCVD). The polysilicon is suitably deposited at a temperature of about 580° C. to about 650° C. to a thickness of about 1 to 2 microns. The polysilicon thus deposited is firmly secured to the wafer by polysilicon which fills the anchor cavities 229 and thus defines integral polysilicon anchors. The cover layer (FIG. 17) is patterned by applying photoresist and exposing the photoresist using the cover mask shown in FIG. 17. The polysilicon is etched to form the cover layer 92. Any suitable polysilicon etching technique can be used. For example, plasma etching with $SF_6$ is suitable to form the cover layer 92. The photoresist thereafter is removed.

The p-type layer 229 (FIG. 18) is implanted in the polysilicon cover layer 92 in a suitable manner. The p-type layer 229 is patterned by applying photoresist and exposing the photoresist with the mask shown in FIG. 19. In the illustrated embodiment, the p-type dopant is boron dosed at a concentration of between $5 \times 10^{14}$ $cm^{-2}$ and $5 \times 10^{15}$ $cm^{-2}$ at an energy level of 60–160 KeV. After the p-type layer 229 is implanted, the photoresist is removed.

Figure 20:
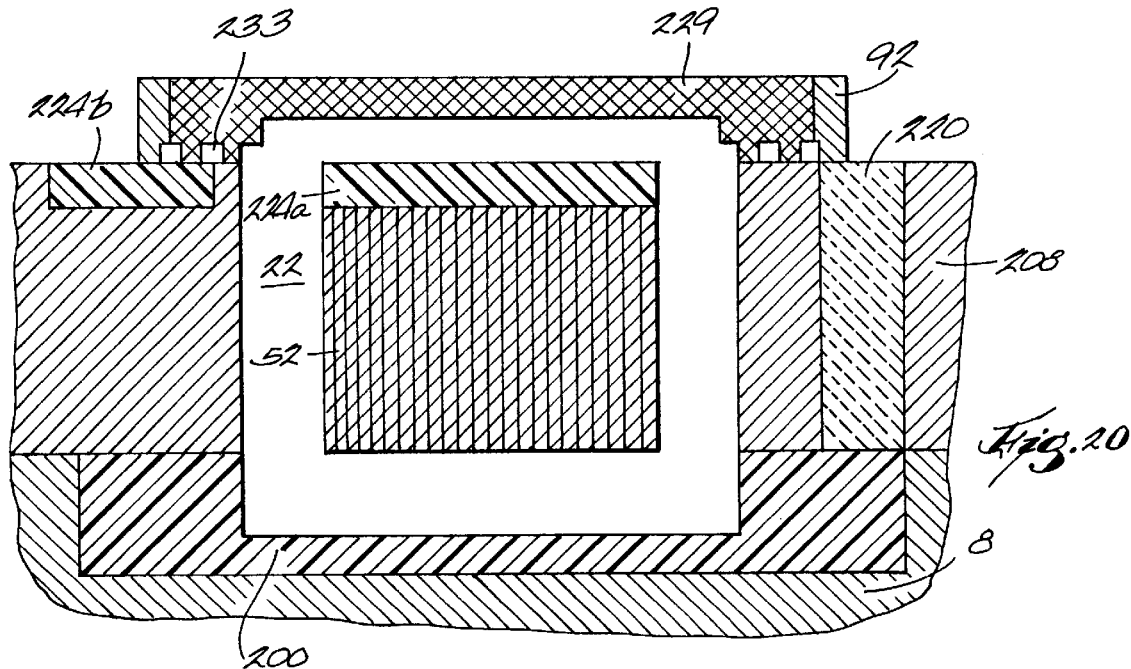
FIG. 20 is a view similar to FIG. 18 and showing a cavity and open etch channels.

The porous silicon dioxide in the precavity region 223 is removed or dissolved by etching to form the cavity 22 (FIG. 20). Any suitable etchant may be employed. In the illustrated embodiment, the etchant is hydrofluoric acid vapor. The use of hydrofluoric acid vapor to etch the cavity 22 avoids having to later dry the cavity. In other embodiments, such as when a liquid etchant is used, it may be necessary to rinse the cavity with water and to dry the cavity by a technique such as sublimation of cyclohexane, as is known in the art. The hydrofluoric acid vapor etches away the $SiO_2$ between the anchor cavities 231, thus forming open etch channels 233 in the layer underneath the cover layer 92, and thereafter etches away the LTO glass forming the sacrificial layer 228 and the silicon dioxide in the precavity region 223. The cavity 22 thus formed is open, in the sense that the etch channels 233 (FIG. 20) were formed by etching in the spaces between the anchor cavities 231 and underneath the cover layer 92.

Figure 21:
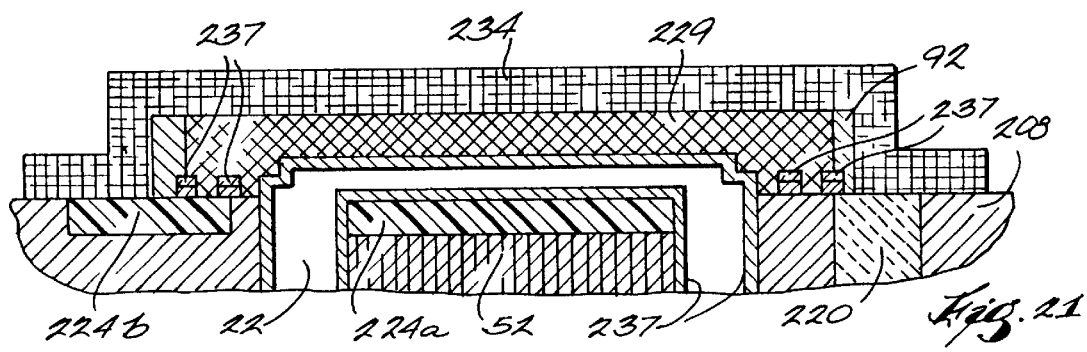
FIG. 21 is a view similar to FIG. 20 and showing the sealed etch channels and an insulating layer.

The cavity 22 is sealed and evacuated in a suitable manner. It is preferred to evacuate the cavity in order to maximize Q of the resonating beam. In the illustrated embodiment, the wafer is oxidized to form residual $SiO_2$ layers 237 (FIG. 21) on the inner surfaces defining the cavity 22 and the etch channels 233. The residual $SiO_2$ layers 237 can be formed by oxidation by pushing 2.25 l/m of $H_2$ and $O_2$ at 850° C. for 10 minutes and oxidizing with 2.25 l/m of $H_2$ and $O_2$ at 850° C. for 30 minutes. The $SiO_2$ layers 237 formed on the inner surfaces of the etch channels 233 substantially closes the etch channels 233. The etch channels 233 are further sealed by depositing sealing polysilicon which fills any openings which may remain between the $SiO_2$ layers 237. In the illustrated embodiment, the sealing polysilicon is deposited at 580° C. to 650° C. to a final thickness of about 1000 angstroms. Excess amounts of the deposited sealing polysilicon thereafter are etched away, leaving residual sealing polysilicon which fills and closes any openings in the $SiO_2$ layer 237. The sealing polysilicon can be etched in any suitable manner. In the illustrated embodiment, the sealing polysilicon is isotropically plasma etched with $SF_6$. The photoresist thereafter is removed. Upon sealing the etch channels 233, $O_2$ remaining in the cavity 22 continues to react until substantially all $O_2$ in the cavity 22 is consumed. The cavity 22 thus is sealed and evacuated. The cavity being evacuated minimizes dampening of the beam and provides a high Q value.

The insulating layer 234 (FIG. 21) is deposited over the cover layer 92 and the n-type epitaxial layer 208 in a suitable manner. Any suitable insulating material can be used. In the illustrated embodiment, the insulating material is silicon nitride. In the illustrated embodiment, the silicon nitride is deposited by low pressure chemical vapor deposition (LPCVD) at 835° C. to a thickness of about 950+/−90 angstroms. The insulating layer 234 insulates the force transducer 10 from undesired electrical contact.

Figure 22:
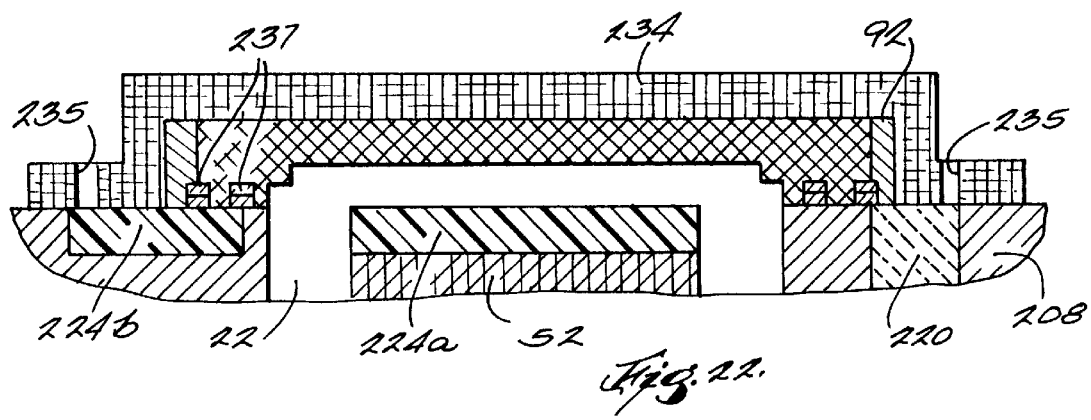
FIG. 22 is a view similar to FIG. 21 and showing electrical contact cavities.
Figure 24:
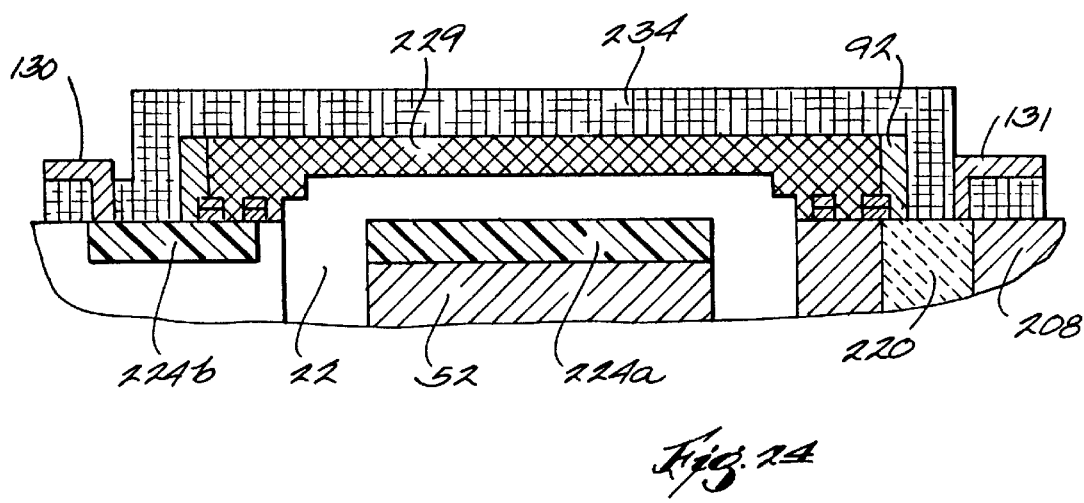
FIG. 24 is a view similar to FIG. 22 and showing metal electrical contacts.

The electrical contacts are deposited in a suitable manner for connection to the integrated circuitry 12 (FIG. 24). In the illustrated embodiment, electrical contact cavities 235 (FIG. 22) are etched for receiving the electrical contacts 130 and 131 (FIG. 24). The electrical contact cavities 235 are patterned by applying photoresist and exposing the photoresist using the electrical contact cavity mask shown in FIG. 23. The insulating layer 234 is etched with a 50:1 buffered oxide etching solution for a period of about 2.5 minutes to form the electrical contact cavities 235 (FIG. 22). The photoresist thereafter is removed. The electrical contacts 130 and 131 (FIG. 24) are then deposited in the electrical contact cavities 235. In the illustrated embodiment, the electrical contacts 130 and 131 are aluminum. The aluminum is deposited to a thickness of about 7500 angstroms and etched using the mask shown in FIG. 25. Thereafter, the aluminum electrical contacts 130 and 131 are alloyed into contact with the silicon by alloying at 450° C. with 15% $H_2$ and 85% $N_2$.

In operation of the force transducer 10, the beam 52 is caused to resonate by operation of the integrated circuitry 12 and the capacitive drive 120. Strain exerted on the beam 52 in the direction of the longitudinal axis changes the resonant frequency of the beam 52. The resistance of the piezoresistor 224 changes in relation to the change in the resonant frequency of the beam 52 and thus changes the output of the integrated circuitry 12. The output signal from the integrated circuitry 12 thus changes in relation to changes in the strain sensed by the beam 52.

The force transducer can be inexpensively formed by single-sided fabrication in relatively few steps. The beam is integral with the wafer and therefore provides a force transducer of high sensitivity and accuracy.

Various features and advantages of the invention are set forth in the following claims.

What is claimed is:

1. A force transducer comprising:

a substrate;

a cavity in said substrate;

a single crystal silicon beam in said cavity, said beam mounted within said cavity so as to resonate within said cavity; and at least one electronic circuit element mounted on said beam so as to generate an electrical output signal in response to said resonance.

2. A force transducer as set forth in claim 1 wherein said cavity has spaced end walls, and spaced side walls, and said beam extends between said end walls of said cavity.

3. A force transducer as set forth in claim 2 wherein said beam has side surfaces, and wherein said side surfaces are spaced from said sidewalls of said cavity.

4. A force transducer as set forth in claim 1 wherein said electronic circuit element is a piezoresistor.

5. A force transducer as set forth in claim 1 and further including means for causing resonant motion of said beam.

6. A force transducer as set forth in claim 1 and further comprising a pair of electrodes defining a capacitive drive for causing resonant motion of said beam.

7. A force transducer as set forth in claim 1 wherein said silicon substrate includes a dopant of one of the n-type and the p-type.

8. A force transducer as set forth in claim 1 wherein said beam has an upper side, and further including a cover layer spaced from and above said upper side of said beam.

9. A force transducer as set forth in claim 1 wherein said cavity is a sealed and evacuated cavity.

10. A force transducer as set forth in claim 1 and further comprising a capacitive drive for causing resonant motion of said beam, said capacitive drive including:
    a first electrode below said beam;
    a second electrode in said beam; and
    a third electrode above said beam.

11. A force transducer as in claim 10, wherein said first electrode includes an n-type dopant, said second electrode includes a p-type dopant, and said third electrode includes a p-type dopant.

12. A microelectronic structure comprising:
    a single crystal silicon substrate;
    a sealed cavity in said substrate, said cavity having spaced end walls;
    a single crystal silicon beam in said cavity, said beam mounted between said end walls within said cavity so as to resonate within said cavity; and
    at least one electronic circuit element mounted on said beam so as to generate an electrical output signal in response to said resonance.

13. A microelectronic structure as set forth in claim 12 wherein said cavity is an evacuated cavity.

14. A microelectronic structure as set forth in claim 12 wherein said cavity includes spaced side walls, and wherein said beam includes side surfaces, and wherein said side surfaces are spaced from said sidewalls of said cavity.

15. A microelectronic structure as set forth in claim 12 wherein said beam has an upper side, and further including a cover layer spaced from and above said upper side of said beam.

16. A microelectronic structure as set forth in claim 12 wherein said electronic circuit element is a piezoresistor.

17. A microelectronic structure as set forth in claim 12 and further including means for causing resonant motion of said beam.

18. A microelectronic structure as set forth in claim 12 and further comprising a pair of electrodes defining a capacitive drive for causing resonant motion of said beam.

19. A microelectronic structure as set forth in claim 12 wherein said silicon substrate includes a dopant of one of the n-type and the p-type.

20. A force transducer comprising:
    a single crystal silicon substrate;
    a sealed and evacuated cavity in said substrate, said cavity having spaced end walls, and spaced side walls;
    a single crystal silicon beam in said cavity, said beam extending between said end walls of said cavity and mounted within said cavity so as to resonate within said cavity, said beam having side surfaces and an upper surface, and said side surfaces are spaced from said sidewalls of said cavity;
    at least one piezoresistor mounted on said beam so as to generate an electrical output signal in response to said resonance;
    a capacitive drive for causing resonant motion of said beam, said capacitive drive including: a first electrode of an n-type dopant located below said beam; a second electrode of a p-type dopant located in said beam; and a third electrode of a p-type dopant located above said beam; and
    a cover layer spaced from and above said upper side of said beam.

21. A force transducer comprising:
    a substrate;
    a cavity in said substrate;
    a single crystal silicon beam in said cavity, said beam mounted within said cavity so as to resonate within said cavity; and
    at least one electronic circuit element mounted on said beam so as to generate an electrical output signal in response to said resonance; and
    a capacitive drive for causing resonant motion of said beam, said capacitive drive including: a first electrode below said beam; a second electrode in said beam; and a third electrode above said beam.

22. A force transducer as in claim 21, wherein said first electrode includes an n-type dopant, said second electrode includes a p-type dopant, and said third electrode includes a p-type dopant.

* * * * *